United States Patent
Holbrook et al.

[19]

[11] Patent Number: 6,079,288

[45] Date of Patent: Jun. 27, 2000

[54] GEAR ARRANGEMENT AND METHOD FOR SELECTING GEARS OF AN AUTOMATIC TRANSMISSION

[75] Inventors: Gerald L. Holbrook, Rochester Hills; Hussein A. Dourra, Dearborn Heights, both of Mich.

[73] Assignee: DaimlerChrylser Corporation, Auburn Hills, Mich.

[21] Appl. No.: 09/283,927

[22] Filed: Apr. 1, 1999

[51] Int. Cl.[7] .................................................. F16H 59/02
[52] U.S. Cl. ......................................................... 74/335
[58] Field of Search ....................................... 74/335, 745

[56] References Cited

U.S. PATENT DOCUMENTS

| | | |
|---|---|---|
| 4,073,203 | 2/1978 | Wurst et al. . |
| 4,462,279 | 7/1984 | Sumiya . |
| 4,566,355 | 1/1986 | Sugano . |
| 4,569,253 | 2/1986 | Higashi et al. . |
| 4,637,281 | 1/1987 | Vanselous . |
| 4,823,646 | 4/1989 | Yoshimura et al. . |
| 4,916,979 | 4/1990 | Irwin . |
| 4,947,331 | 8/1990 | Speranza . |
| 4,951,528 | 8/1990 | Ueki et al. . |
| 5,038,636 | 8/1991 | Vukovich et al. . |
| 5,121,657 | 6/1992 | Asada . |
| 5,152,192 | 10/1992 | Koenig et al. . |
| 5,188,006 | 2/1993 | Goto et al. . |
| 5,235,879 | 8/1993 | Minowa et al. . |
| 5,416,700 | 5/1995 | Bates et al. . |
| 5,435,212 | 7/1995 | Menig ........................................ 74/745 |
| 5,470,290 | 11/1995 | Minowa et al. . |
| 5,555,170 | 9/1996 | Nakashima . |
| 5,603,673 | 2/1997 | Minowa et al. . |
| 5,676,017 | 10/1997 | Allen, Jr. et al. ........................ 74/745 |

*Primary Examiner*—Dirk Wright
*Attorney, Agent, or Firm*—Marc Lorelli

[57] ABSTRACT

A novel transmission is provided that has a first, second, third and fourth gear, wherein said second gear includes two alternate and selectable speed ratios. The primary speed ratio of the second gear is used during upshifts and downshifts of adjacent gears. The alternate speed ratio of the second gear is utilized exclusively during downshifts from non-adjacent gears and may also be utilized during a downshift from the third gear depending on certain conditions and parameters. The primary speed ratio is larger than the alternate speed ratio of the second gear to provide better acceleration characteristics of the transmission during upshifting. The smaller alternate speed ratio of the second gear can provide smoother downshifts because of the less abrupt speed ratio change from the higher gears. Also, a method for controlling the gear selection of an automatic transmission having a plurality of gears is provided, wherein one position includes two speed ratios.

16 Claims, 4 Drawing Sheets

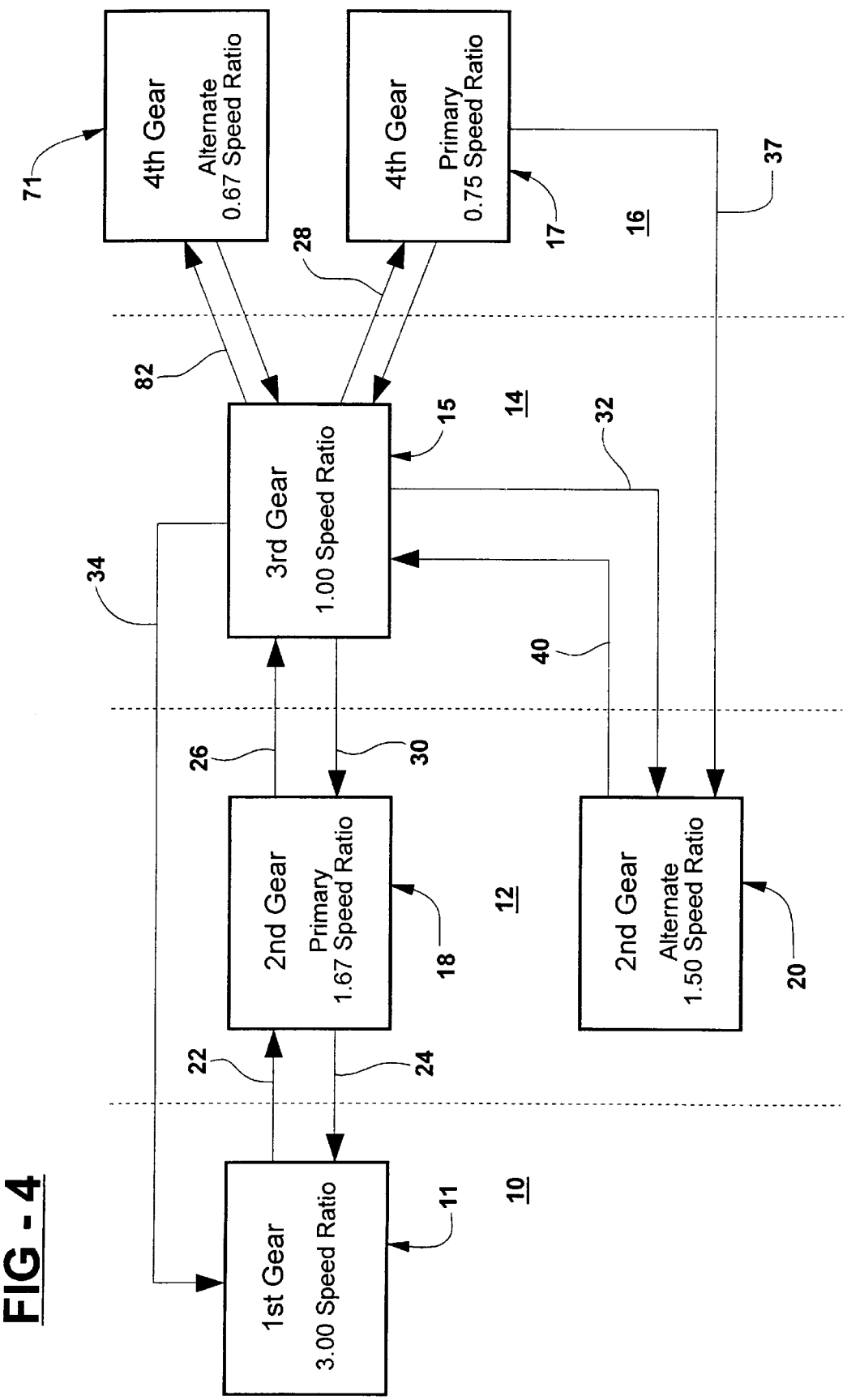

GEAR ARRANGEMENT AND METHOD FOR SELECTING GEARS OF AN AUTOMATIC TRANSMISSION

BACKGROUND OF THE INVENTION

1. Technical Field

The present invention generally relates to automatic transmissions. More specifically, but without restriction to the particular embodiment and/or use which is shown and described for purposes of illustration, the present invention relates to an automatic transmission having a primary and alternate speed ratio within the same gear.

2. Discussion

Automotive drivetrains generally include similar basic components. An internal combustion engine, or some other type of power plant, is typically the primary source of power on board a vehicle. An internal combustion engine produces power by converting chemical energy from a liquid fuel into mechanical energy of motion. The engine produces power that ultimately will drive the wheels of the vehicle. The major drivetrain component between the wheels and the engine is a transmission. The transmission translates engine torque to the wheels. The primary function of an automotive transmission is to provide the proper speed ratio between the rotational speed of the engine and the desired rotational speed of the wheels. The transmission also controls the direction of rotation applied to the wheels so that the vehicle may be driven forward and backward.

Transmissions are typically automatic, manual or some combination thereof. Automatic transmissions are designed to take automatic control of the frictional units or clutch elements, speed ratio selection and gear shifting. A thorough description of general automatic transmission design principals may be found in "Fundamentals of Automatic Transmissions and Transaxles," Chrysler Corporation Training Manual No. TM-508A, which is incorporated herein by reference. Additional descriptions of automatic transmissions may be found in U.S. Pat. No. 3,631,744, entitled "Hydromatic Transmission," issued Jan. 4, 1972 to Blomquist, et al., U.S. Pat. No. 4,951,200, entitled "Method of Controlling the Apply Element During A Kick-Down Shift For An Electronic Automatic Transmission System", issued on Aug. 21, 1990 to Leising, et al., U.S. Pat. No. 4,289,048, entitled "Lock-up System for Torque Converter," issued on Sep.15, 1981 to Mikel, et al., and U.S. Pat. No. 4,875,391, entitled "Electronically-Controlled, Adaptive Automatic Transmission System" issued on Oct. 24, 1989 to Leising, et al. The aforementioned patents are owned by the assignee of the present application and are incorporated herein by reference.

Generally, automatic transmissions include gear elements for defining several different forward speed or gear ratios between the input and the output shaft of the transmission, the input shaft being linked to the engine and the output shaft being indirectly linked to the wheels. The shifting between speed ratios is facilitated by a number of clutches that can be applied and released by hydraulic pressure to create an array of speed ratios between the input and output shaft. Typically, two clutches are applied to create a forward speed ratio. When a change from one speed ratio to another is desired, one of the applied clutches releases as another clutch applies to create a speed ratio different from the previous speed ratio. The clutches are attached to various gear sets, when certain clutches are applied torque is delivered to the proper gear sets to produce the desired ratio.

A transmission has a number of gears, typically, first, second, third and fourth gears. Typically, each gear has an associated speed ratio. The speed ratio created by the application of fluid operated clutches is typically defined as Ni/No, where Ni is the input shaft speed and No is the output shaft speed. The lower the gear, the higher the speed ratio. Conversely, the higher the gear, the lower the speed ratio. Accordingly, a shift from a given speed ratio to a lower speed ratio is termed up-shifting, while a shift from a given speed ratio to a higher speed ratio is termed downshifting. Typically, an automatic transmission only up-shifts to adjacent gears while downshifting may occur to non-adjacent gears to accommodate certain driving situations.

The art of shifting a transmission has been grounds to many innovations over the years. The precise speed ratios utilized as well as the shifting sequence is crucial in developing a drivetrain that is smooth and efficient. There is a continual need to develop drivetrains that are more efficient, shift more smoothly, minimize engine noise, and increase performance. Developing unique shifting schemes as well unique speed ratio configurations can help in meeting this continual need for drivetrain development.

SUMMARY OF THE INVENTION

Accordingly, it is a principal objective of the present invention to provide an automatic transmission with a unique gear and speed ratio arrangement.

It is another objective of the present invention to provide an automatic transmission with a plurality of gears with at least one gear having at least two speed ratios.

It is still another objective of the present invention to provide a method of shifting an automatic transmission.

It is yet another objective of the present invention to provide a method for shifting between non-adjacent gears of an automatic transmission.

In one form, the present invention provides a novel transmission that has a first, second, third and fourth gear. A typical gear will have one speed ratio associated therewith. The present invention provides a second gear having a primary and alternate speed ratio associated therewith. The primary speed ratio of the second gear is 1.67 and is used during upshifts and downshifts of adjacent gears. The alternate speed ratio of the second gear is 1.5 and is utilized exclusively during downshifts from non-adjacent gears and may also be utilized during a downshift from the third gear depending on certain conditions and parameters. The primary speed ratio is larger than the alternate speed ratio of the second gear to provide better acceleration characteristics of the transmission during upshifting. The smaller alternate speed ratio can provide smoother downshifts because of the less abrupt speed ratio change from the higher gears. The present invention utilizes a total of five different speed ratio created by the application of various clutches in the transmission. Only four of the speed ratios are used during sequential upshifting of the transmission. Furthermore, only the highest speed ratio, i.e. the speed ratio of the first gear, and the one speed ratio not used during sequential upshifting of the transmission can accommodate and receive downshifts from non adjacent gears.

In another form, the present invention provides a novel transmission control method for a transmission having a first, second, third, and fourth gear with the second gear having a primary and alternate speed ratio. The method includes downshifting from the fourth gear to the alternate speed ratio of the second gear and limiting downshifting from the fourth gear to the primary speed ratio of the second gear during normal driving conditions. The method further includes limiting the transition between the primary and alternate speed ratios of the second gear during normal conditions. The method also limits shifting from the first gear to the alternate speed ratio of the second gear. The present invention also provides for (1) downshifting from the third gear to the alternate speed ratio of the second gear when the speed of the output shaft is faster than a predetermined speed; and (2) downshifting to the primary speed ratio of the second gear when the speed of the output shaft is slower than said predetermined speed.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 4 is a schematic diagram of an alternate embodiment of the various speed ratios and gears of an automatic transmission.

DETAILED DESCRIPTION OF THE PREFERRED EMBODIMENT

Figure 1:
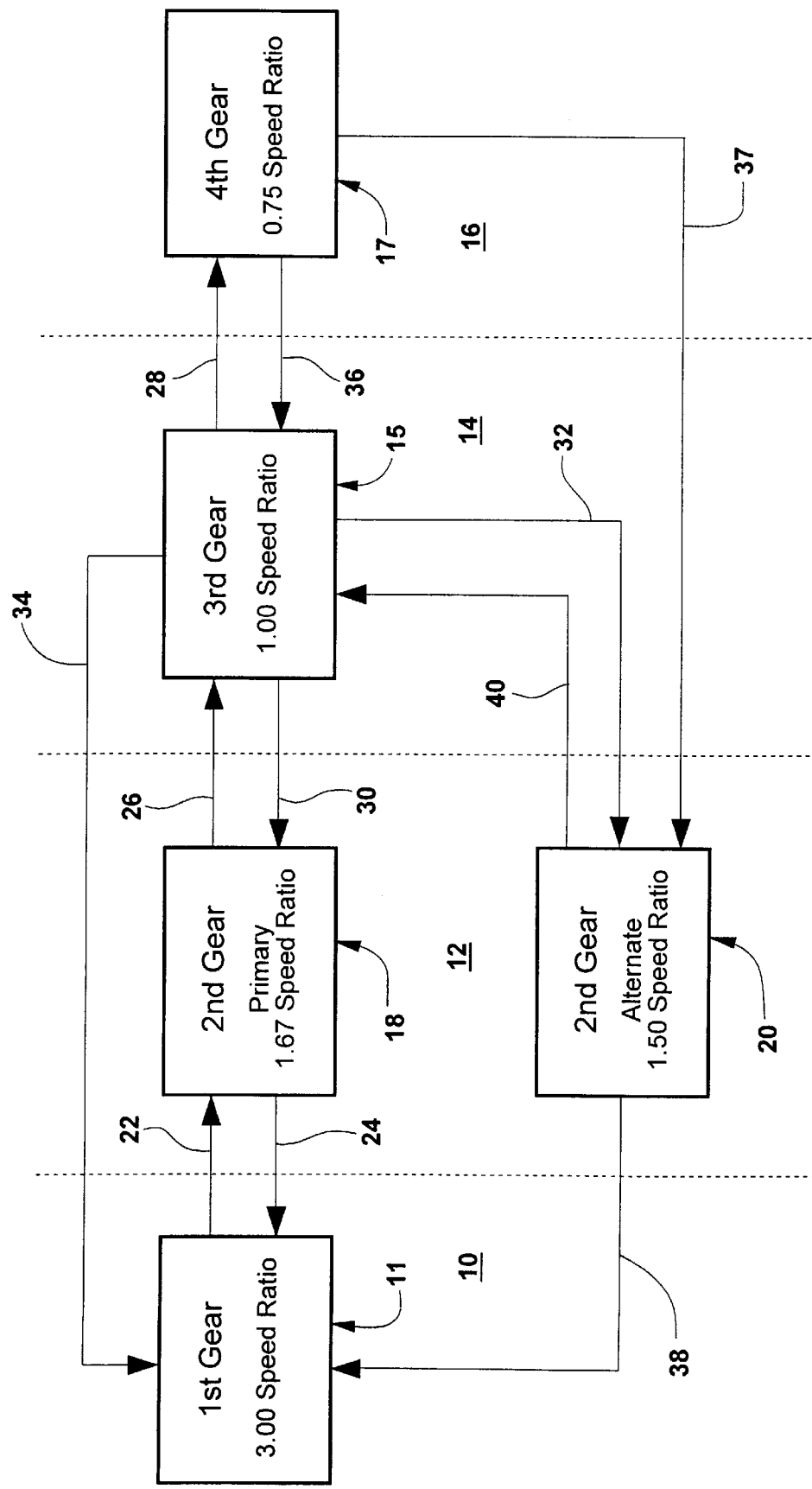
FIG. 1 is a schematic diagram of the various speed ratios and gears of an automatic transmission.

Referring now to the drawings, FIG. 1 illustrates a schematic diagram embodying a concept of the present invention. An automatic transmission having a plurality of gears 10, 12, 14, 16 is provided. The second gear 12 includes preferably two speed ratios 18 and 20. The first gear 10, third gear 14, and fourth gear 16 include preferably one speed ratio. A speed ratio is numerically defined by the ratio Ni/No where Ni is the speed of the input shaft and No is the speed of the output shaft. Therefore, at a speed ratio of 1.00 the input shaft and the output shaft are spinning at essentially the same speed. At speed ratios higher than 1.00 the Input shaft is spinning at speeds higher than the output shaft.

In the preferred embodiment, the first gear includes a first speed ratio 11 having a numerical value of 3.00. The second gear 12 includes a primary speed ratio 18 having a numerical value of 1.67 and an alternate speed ratio 20 having a numerical value of 1.50. The third gear 14 includes a third speed ratio 15 having a numerical value of 1.00. The fourth gear 16 includes a fourth speed ratio 17 having a numerical value of 0.75. The transition between different gears is termed shifting. The term gear is utilized to denote the operational settings of the transmission and are separated by dotted lines in FIG. 1. Shift position is also a common phrase to describe what is referred to as gear in the present application, shift position and gear are used interchangeably herein. Therefore, in order to shift, the transmission must change gears, thereby crossing a dotted line. In other words, for the speed ratio of the transmission to change, a shift must occur, and hence a change in gears must occur. Each speed ratio between the input and the output shaft is established by applying clutches to create a gear ratio therebetween. Typically, two clutches are applied to create a forward gear. When shifting from one gear to another, only one clutch is typically released while another clutch is applied to change the speed ratio. The clutch that is not released remains on or engaged through the shift and while in the gear shifted into.

The exemplary embodiment includes five clutch elements. A low reverse clutch (LR) is applied while the transmission is in the first gear 10, while the transmission is in reverse, and during certain engine braking conditions. A $2^{nd}$ clutch (2C) is applied while the transmission is in the primary speed ratio 18 of the second gear 12. An overdrive clutch (OD) is applied while the transmission is in the third gear 14 and fourth gear 16. A $4^{th}$ Clutch (4C) is applied while the transmission is in the alternate speed ratio 20 of the second gear 12 and while the transmission is in the fourth gear 16. An underdrive clutch (UD) is applied while the transmission is in the first gear 10, third gear 14, and while in the primary and secondary speed ratios 18 and 20 of the second gear 12. The following chart illustrates the application of clutch elements in the forward gears.

| Clutch Element | in1 | in2 | in2' | in3 | in4 | in4' |
|---|---|---|---|---|---|---|
| LR | ON | OFF | OFF | OFF | OFF | OFF |
| 2C | OFF | ON | OFF | OFF | OFF | ON |
| OD | OFF | OFF | OFF | ON | ON | ON |
| 4C | OFF | OFF | ON | OFF | ON | OFF |
| UD | ON | ON | ON | ON | OFF | OFF |

It can be appreciated from the above description that in order to shift from the primary speed ratio 18 of the second gear 12 to the third gear 14, the OD clutch element must be applied while the 2C clutch element is released. The applying and releasing of the clutch elements is performed simultaneously so as to provide a shift as smooth as possible. It can also be appreciated that the hydraulic application of the clutch elements may be controlled electronically and provide an applying and releasing scheme that adapts to the driving preferences of the operator of the vehicle, as illustrated in U.S. Pat. No. 4,875,391, entitled "Electronically-Controlled, Adaptive Automatic Transmission System" issued on Oct. 24, 1989 to Leising, et al. The clutches are attached to a gear component of the transmission, which has the ability to provide a plurality of speed ratios. As certain clutches are applied, the torque is transferred from the input shaft through the gear component and to the output shaft. The gear set effectively creates the speed ratio. In the preferred embodiment, the gear component consists of three planetary gear sets. One such arrangement is described in commonly owned U.S. Pat. No. 5,588,929 titled "Four-Speed Automatic Transmission" issued Dec. 31, 1996, and is incorporated herein by reference.

FIG. 1 illustrates the possible shifts between gears by arrows. As a vehicle begins from a stopped position, the LR and the UD clutch are applied creating a speed ratio of 3.00. As the vehicle gains speed, a shift to a lower speed ratio is required. An upshift 22 from the first gear 10 to the second gear 12 is required to reduce the speed ratio to 1.67. It is significant to note that during an upshift from the first gear 10 to the second gear 12 the primary speed ratio 18 is utilized as opposed to the alternate speed ratio 20. While in the primary speed ratio 18 of the second gear 12, the transmission may, depending on the shift schedule, either downshift 24 to the first gear 10 or upshift 26 to the third gear 14. In the third gear 14, the transmission can upshift 28 to the fourth gear 16, downshift 30 to the primary speed ratio 18 of the second gear 12, downshift 32 to the alternate speed ratio 20 of the second gear 12, or downshift 34 to the non-adjacent first gear 10. In the fourth gear 16, the speed ratio is the lowest available, therefore, only downshifting can occur. The transmission can downshift 36 to the third gear or the transmission can downshift 37 to the non-adjacent alternate speed ratio 20 of the second gear 12. In the alternate speed ratio 20 of the second gear 12, the transmission can downshift 38 to the first gear 10 or upshift 40 to the third gear 14. It is important to note that utilization of the alternate speed ratio 20 of the second gear 12 is only achieved during downshifts and not upshifts. It is also important to note that shifting within a gear is not allowed. For example, if the transmission is in the primary speed ratio 18 of the second gear 12 the transmission will not shift directly to the alternate speed ratio 20 of the second gear, every shift must cause a change in gears to occur by definition.

Figure 2:
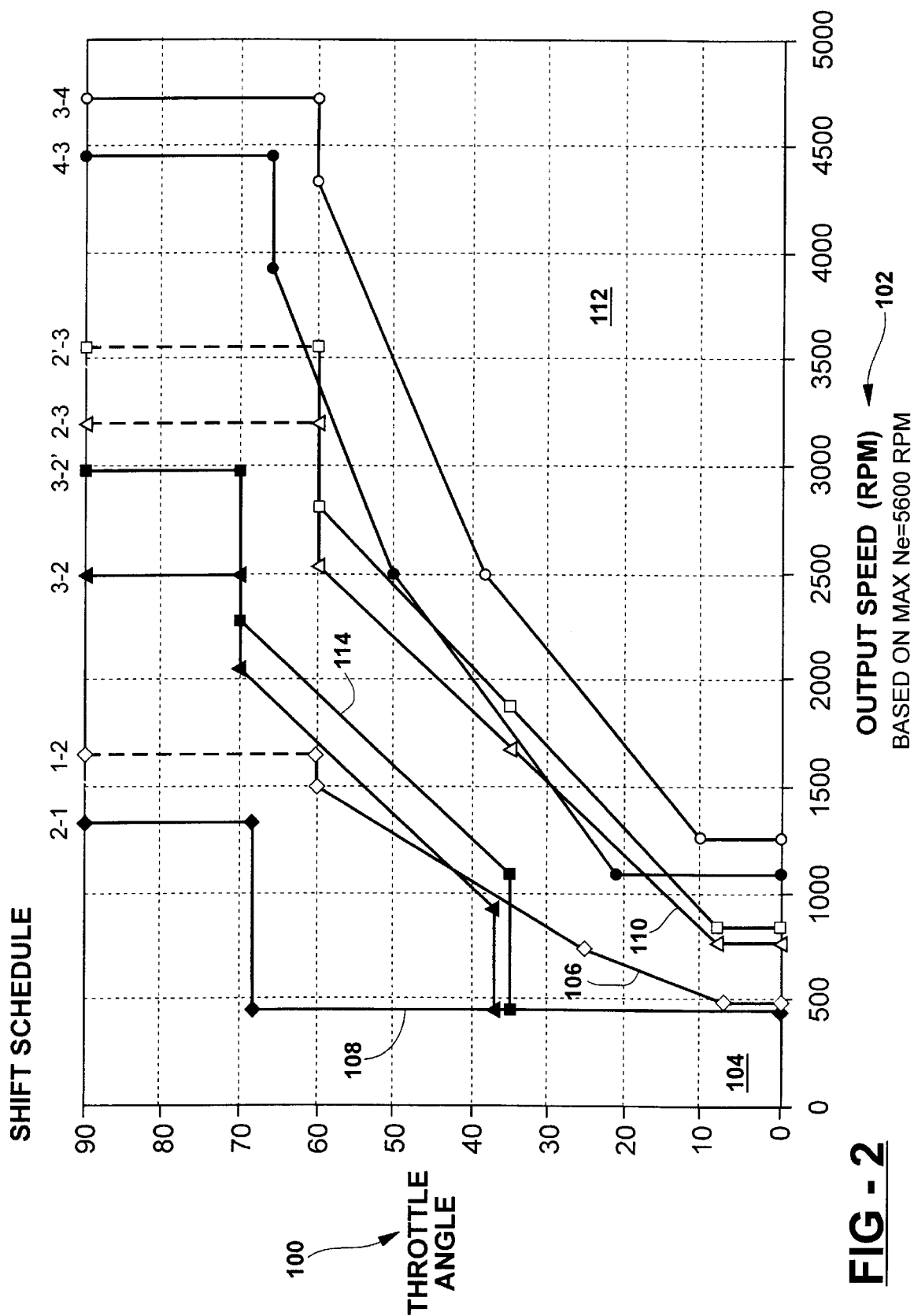
FIG. 2 is a graph showing the shift schedule of an automatic transmission.

Turning to FIG. 2, the shift schedule of the automatic transmission is illustrated. Please note that all upshifting boundaries are depicted with bordered or un-filled indicators and that all downshifting boundaries are depicted with solid or filled in indicators. The throttle angle 100 and the output shaft speed 102 define a point on the shift schedule. For example, at rest a transmission has an output shaft speed of 0 and a very minimal throttle angle defining a point in the region 104 which is in the first gear 10 having a first speed ratio 11. As the throttle is increased and the output speed of the transmission increases in response thereto a shift to the primary speed ratio 18 of the second gear 12 will occur as the conditions, throttle 100 and output speed 102, define a point on boundary 106. Therefore, in order to shift from the first gear 10, the throttle 100 and output shaft speed 102 must define a point on the shift schedule on or to the right of boundary 106. One can appreciate that while in the primary speed ratio 18 of the second gear 12, the transmission can downshift to the first gear 10 if the throttle and output speed define a point on or to the left of boundary 108. One can also appreciate that the transmission can also upshift if the point defined by throttle and output speed pass boundary 110. The upshifting of gears continued in such a manner as previously described until the fourth gear 16 is obtained. In the fourth gear 16 the throttle and output speed define a point in the region marked 112 of the shift schedule. The increasing of the throttle angle 100 tends to invite a lower gear, therefore, during operation an upshift will not be desired during a sudden increase in throttle angle. In fact, the transmission will typically not upshift until the output shaft speed increases enough to warrant the shift. However, during a sudden increase in throttle angle, the transmission may downshift without appreciable output speed changes, depending on the shift schedule. For the sake of illustration, if the transmission is operating in the fourth gear 16 at a throttle angle of 20 and a output speed of 2000 RPMs, and a sudden increase in throttle angle 100 occurs to a value greater than 40, the transmission will downshift. If the throttle increases to 50, the transmission will downshift into the third gear 14. However, if the throttle increases to 65 a shift to the third gear 14 will continue unless: (1) the release element has not slipped by a predetermined amount from the fourth in-gear condition, for example, the input shaft speed Ni has not increased by more than 100 RPM from the fourth speed ratio 17 times the output shaft speed, (2) the oil temperature is greater than 30 degrees Fahrenheit, (3) the shift lever position is in drive, (4) an alternate speed ratio 20 demand from the shift schedule, and (5) the throttle is greater than 10 degrees, then a shift to the alternate speed ratio 20 of the second gear 12 will be commanded if all 5 of these conditions are met. Please note, increasing the throttle to 65 while at roughly 2000 RPM crosses the 3-2' boundary 114, thereby, satisfying afore-mentioned fourth (4) condition. This will provide the operator with more torque than would be available in third gear, as well as a faster and smoother downshift than by going to the primary speed ratio 18 of the second gear 12 after the completion of the shift to third gear 14. It should also be appreciated that a shift from the fourth gear 16 to the primary speed ratio 18 of the second gear 12 is not allowed by the logic. Such a shift is not allowed by the logic since the arrangement of clutches would require a double swap, two clutches releasing while two clutches are applying, which can yield poor shift quality. Once the transmission is in the alternate speed ratio 20 of the second gear 12, only a downshift to the first gear 10 or an upshift to the third gear 14 is allowed.

The other way to engage the alternate speed ratio 20 of the second gear 12 is from the third gear 14. While in the third gear 14, if (1) the output shaft speed is greater than 2500 RPM, and (2) the throttle angle is increased above 70 degrees, (3) the oil temperature is greater than 30 degrees Fahrenheit, (4) the shift lever position is in drive, and (5) an alternate speed ratio 20 demand from the shift schedule, the transmission will shift into the alternate speed ratio 20 of the second gear 12. Shifting into the alternate speed ratio 20 is preferred over the primary speed ratio 18 at higher RPMs because of its lower speed ratio. Again, once the transmission is in the alternate speed ratio 20 of the second gear 12, only a downshift to the first gear 10 or an upshift to the third gear 14 is allowed.

Figure 3:
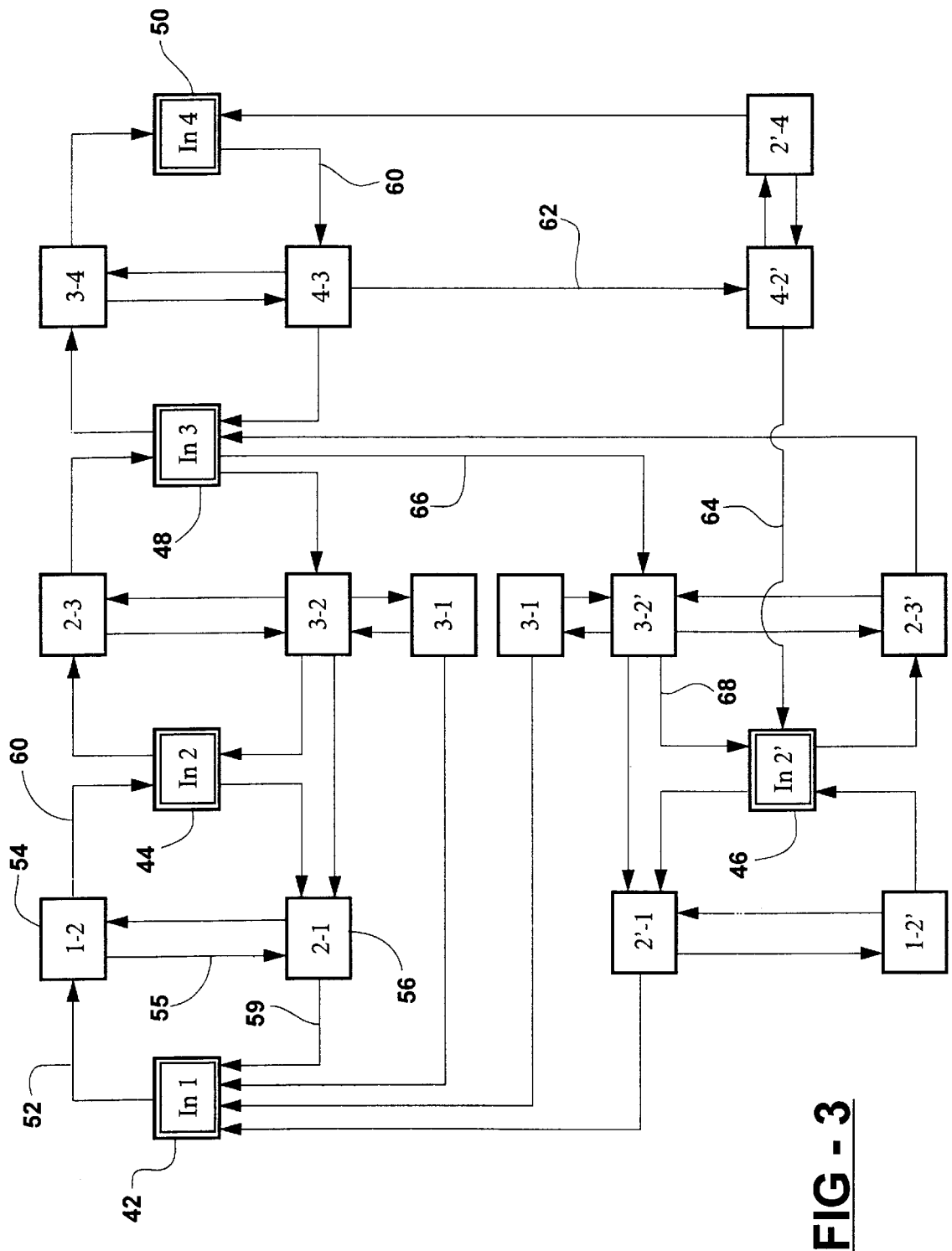
FIG. 3 is a schematic diagram of the shift logic selection scheme of an automatic transmission.

Turning now to FIG. 3, a detailed shift logic selection scheme is illustrated. The in-gear logic is noted by the double framed boxes 42, 44, 46, 48, and 50. Numerical label 42 references first gear logic. Numerical labels 44 and 46 reference the primary and alternate second gear logic, respectively. Numerical label 48 references third gear logic and numerical label 50 references fourth gear logic. When the automatic transmission is operating in one of these in-gear logic regimes, the speed ratio is defined. The single framed boxes are indicative of shift logic. Shift logic is needed to shift the automatic transmission between gears. It should be appreciated that the shifting between gears is relatively quick, the majority of the operation of the transmission is spent in a gear and controlled by in-gear logic. Every control path, as represented by an arrow, in FIG. 3 requires that certain conditions are met before transition thereby into shift logic control, or a single framed box. The conditions are typically dependent on the shift schedule, the last in gear, and various other parameters including throttle position, clutch volume, and input shaft speed. One of ordinary skill in the art may apply various conditional requirements to provide the desired driveability characteristics of the automatic transmission. It is important to note that there are essentially two ways to achieve the alternate speed ratio 20 of the second gear 12, indicated as in 2' and referenced by numeral 46. The first way, a downshift from the fourth gear 16 to the alternate speed ratio 20 is shown generally by paths 60, 62, and 64 with shift logic 4-3 and 4-2' therebetween. The second way, a downshift from the third gear 14 to the alternate speed ratio 20 of the second gear 12 is shown generally by 66 and 68 with shift logic 3-2' therebetween.

Starting the associated vehicle with the transmission in the first gear 10 having a first speed ratio 11 is controlled using in-gear logic 42. As an upshift is desired, according to the shift schedule, FIG. 2, and various other parameters the logic of the transmission follows path 52 to establish shift logic 54 between the first gear logic 42 and the primary second in-gear logic 44 of the second gear 12. If the shift schedule calls for the first gear and certain conditions or parameters have not occurred while transitorily in shift logic 54, such as a significant change in the output shaft speed, the transmission can transition into shift logic 56 by following path 55. The transmission can then return, via 59, to in-gear logic 42. Typically, the transmission will continue to desire the second gear 12, while in the transitory shift logic 54 region. Therefore, the transmission will follow line 60 and then be controlled by in-gear logic 44. One may appreciate that during upshifting, the transmission will always shift sequentially from in-gear logic 42, to in-gear logic 44, to in-gear logic 46, and to in-gear logic 48. Downshifting requires the shifting between non-adjacent gears in certain driving conditions. For example, if a downshift is demanded, per the shift schedule in FIG. 2, while the transmission is operating in the in-gear logic 50 of the fourth gear 16, the transmission begins to shift to the third gear 14 or in-gear logic 48. But the transmission may then be triggered, again per the shift schedule and other parameters, to shift into the alternate speed ratio 20 of the second gear 12 as indicated by in-gear logic 46 in FIG. 3. Although the shift logic involving the third gear 14 is involved, this is essentially a downshift between non-adjacent gears because the in-gear logic 48 of the third gear is never achieved. The transmission shifts from a speed ratio of 0.75 in the fourth gear 16 to a speed ratio of 1.5 in the alternate speed ratio 20 of the second gear.

An alternative method for selecting gears of an automatic transmission is shown in FIG. 4. In this alternate embodiment, the first gear includes a first speed ratio 11 having a numerical value of 3.00. The second gear 12 includes a primary speed ratio 18 having a numerical value of 1.67 and an alternate speed ratio 20 having a numerical value of 1.50. The third gear 14 includes a third speed ratio 15 having a numerical value of 1.00. The fourth gear 16 includes a primary fourth speed ratio 17 having a numerical value of 0.75, and an alternate fourth speed ratio 71 having a numerical value of 0.67. The transition between different gears is termed shifting. The term gear is utilized to denote the operational settings of the transmission and are separated by dotted lines in FIG. 4. Therefore, in order to shift, the transmission must change gears, thereby crossing a dotted line. In other words, for the speed ratio of the transmission to change, a shift must occur, and hence a change in gears must occur. The applying of clutches necessary to create the aforementioned speed ratios were set forth in the previous clutch element chart. Each speed ratio between the input and the output shaft is established by applying clutches to create a gear ratio therebetween. Typically, two clutches are applied to create a forward gear. When shifting from one gear to another, one clutch is released while another clutch is applied to change the speed ratio. Although the clutch arrangement allows for a transition between the primary speed ratio 17 in the fourth gear 16 and alternate speed ratio 71 in the fourth gear 16, the electronics of the transmission limits such a swap consistent with the present invention. From the third gear 14, the transmission can select either to upshift 28 to the primary speed ratio 17 or upshift 82 to the alternate speed ratio 71 of the fourth gear 16 depending on the desired operating parameters including, but not limited to, performance and driveability parameters.

While the above description constitutes the preferred embodiment of the invention, it will be appreciated that the invention is susceptible to modification, variation, and change without departing from the proper scope or fair meaning of the accompanying claims.

What is claimed is:

1. An automatic transmission for a motor vehicle, comprising:
a plurality of shift positions, one of said shift positions having a primary and a secondary speed ratio, wherein said automatic transmission operates in one of said plurality of shift positions and changing between said plurality of shift positions is implemented automatically.

2. The transmission as set forth in claim 1, wherein said plurality of shift positions includes a first, second, third, and fourth shift position, said second shift position having said primary and secondary speed ratios.

3. The transmission as set forth in claim 2, wherein said primary speed ratio of said second shift position is used during upshifts and downshifts of adjacent shift positions, and said secondary speed ratio of said second shift position is used during downshifts from non-adjacent shift positions.

4. The invention as set forth in claim 2, wherein said fourth shift position has a speed ratio less than 1.

5. The invention as set forth in claim 4, wherein said first shift position has a speed ratio greater than 2.5.

6. The invention as set forth in claim 5, wherein said secondary speed ratio is less than that of said primary speed ratio of said second shift position.

7. An automatic transmission having a plurality of sequentially disposed shift positions comprising:
a first forward speed ratio of a first shift position;
a fourth forward speed ratio lower than said first forward speed ratio of said first shift position;
a defined number of two or more forward speed ratios between said first forward speed ratio and said fourth forward speed ratio, wherein said first speed ratio, said fourth speed ratio, and less than said defined number of speed ratios are used during sequential upshifting of the automatic transmission, said upshifting is implemented automatically.

8. The transmission as set forth in claim 7, wherein one of said defined number of forward speed ratios not used during sequential upshifting of the transmission is adapted to accommodate and receive downshifts from non-adjacent shift positions.

9. A method for shifting an automatic transmission including an input and an output shaft, said automatic transmission having a first, second, third and fourth shift position with said second shift position having a primary and alternate speed ratio, comprising the steps of:
downshifting from said fourth shift position to said alternate speed ratio of said second shift position; and
limiting downshifting from said fourth shift position to said primary speed ratio of said second shift position.

10. The method as set forth in claim 9, further comprising the step of:
limiting transitioning between said primary and alternate speed ratios of said second shift position.

11. The method as set forth in claim 9, further comprising the step of:
limiting shifting from said first shift position to said alternate speed ratio of said second shift position.

12. The method as set forth in claim 9, further comprising the step of:
downshifting from said third shift position to said alternate speed ratio of said second shift position when the output shaft is rotating faster than a first predetermined speed; and
downshifting from said third shift position to said primary speed ratio of said second shift position when the output shaft is rotating slower than said first predetermined speed.

13. The method as set forth in claim 9, wherein said downshifting from said fourth shift position to said alternate speed ratio of said second shift position is dependent upon shift logic between the fourth shift position and third shift positions.

14. A method for shifting an automatic transmission including an input and an output shaft, said automatic transmission having a first, second, third and fourth shift position with said second shift position and said fourth shift position include a primary and alternate speed ratio, said method comprising the steps of:

limiting transitioning between said primary and alternate speed ratio of said second shift position.

15. The method as set forth in claim 14, further comprising the step of limiting transitioning between said primary and alternate speed ratio of said fourth shift position.

16. The method as set forth in claim 15, further comprising the steps of:

downshifting from said primary speed ratio of said fourth shift position to said alternate speed ratio of said second shift position; and downshifting from said alternate speed ratio of said fourth shift position to said primary speed ratio of said second shift position.

* * * * *